United States Patent [19]

Secor et al.

[11] 4,010,116

[45] Mar. 1, 1977

[54] FLUID CRACKING CATALYSTS

[75] Inventors: Robert B. Secor, Whittier; Robert A. Van Nordstrand, Pasadena; David R. Pegg, Montebello, all of Calif.

[73] Assignee: Filtrol Corporation, Los Angeles, Calif.

[22] Filed: Oct. 15, 1974

[21] Appl. No.: 514,567

[52] U.S. Cl. .............................. 252/455 Z; 208/120
[51] Int. Cl.$^2$ .......................................... B01J 29/06
[58] Field of Search ................. 252/455 Z; 208/120

[56] References Cited

UNITED STATES PATENTS

| | | | |
|---|---|---|---|
| 3,652,449 | 3/1972 | Young et al. | 208/120 X |
| 3,876,558 | 4/1975 | Granquist | 252/455 Z |

*Primary Examiner*—Carl F. Dees
*Attorney, Agent, or Firm*—Philip Subkow; Bernard Kriegel

[57] ABSTRACT

This invention relates to a high-activity catalyst of improved thermal stability employing a zeolite of the faujasite type, pseudoboehmite alumina gel and a synthetic mica-montmorillonite and may also include a clay.

37 Claims, 3 Drawing Figures

FLUID CRACKING CATALYSTS

BACKGROUND OF THE INVENTION

This invention relates to catalysts useful in catalytic hydrocarbon conversion operations, such as cracking. One type catalyst employs as a catalytic component alumino-silicate zeolite having an X-ray diffraction pattern similar to that of the zeolites with the structure faujasite. (See, for example, the Milton U.S. Pat. No. 2,882,244 and the Breck U.S. Pat. No. 3,130,007). In the catalysts which incorporate such zeolites, the alumino-silicate zeolite is exchanged usually with a polyvalent cation, such as an alkaline earth or a rare-earth cation. In the usual case, such zeolites have been mixed with a matrix which may also have some catalytic activity.

An example of such a catalyst is a composite of hydrated alumina, an acid-treated clay, and a material identified as silicated clay in U.S. Pat. No. 3,446,727 which has been exchanged with magnesium and rare-earth cations. The so-called silicated clay may be produced with $Al_2O_3:SiO_2$ ratios of from 1:2 to 1:6. The clay which is converted may be either the acid-treated clay or kaolinite which has been calcined to destroy its X-ray crystallinity. The X-ray pattern of the silicated clay has peaks which are similar to those found in the faujasite X-ray diffraction pattern. All of the foregoing alumino-silicates are herein referred to as zeolites of the faujasite type.

The zeolite catalysts referred to above are unstable when subjected to high temperatures, particularly in the presence of steam. Their catalytic activity is reduced rapidly.

The cracking process operates at two levels of temperature. The catalyst is in contact with a hydrocarbon vapor to be converted at a relatively high temperature. In this process, the catalyst becomes contaminated with carbon and high-boiling hydrocarbon. In order to remove the contaminants, the catalyst is subjected to regeneration before it is returned to the cracking zone. The catalyst is purged with steam to remove hydrocarbon vapors and introduced into a regeneration zone where the carbon and hydrocarbons in the catalyst are burned by hot air introduced into the regeneration zone. The regeneration temperature is many degrees higher than the reaction temperature. The regenerated catalyst is returned to the reaction zone. The zeolite component of the prior art catalysts loses a substantial portion of its crystallinity and activity under these conditions.

In order to test the activity of the catalyst, it is the practice in the catalytic-cracking art to measure the catalyst activity by a bench-scale test. Various tests have been accepted by the cracking art. An early and widely used test was the Cat A Test (see U.S. Pat. No. 3,446,727).

More recently, an activity test known as the micro-activity test has been adopted (see Oil and Gas Journal, 1966, Vol. 64, No. 39, pp. 7, 84, 85; and Nov. 22, 1971, pp. 60–68).

When the "high activity" catalysts were originally developed, the cracking and regeneration temperatures were at a level which permitted he use of these catalysts. (See U.S. Pat. No. 3,446,727). More recently, the regeneration step required higher temperature conditions. These thermal conditions are so severe that a catalyst of improved stability is required. The "high-activity" catalysts of the prior art referred to above are inactivated in a substantial degree when subjected to these more severe conditions.

In order to test the thermal stability of the catalyst and, therefore, its resistance to the high temperature and steam conditions encountered in commercial cracking operations, it is subjected to high-temperature steam treatment prior to being subjected to the bench-scale tests. Originally, when the catalysts were regenerated under conditions of moderate severity, the catalysts were tested by subjecting them to steam at 1350° F. for 4 hours (see U.S. Pat. Nos. 2,935,463 and 3,446,727). Subsequently, the temperature of the steaming was increased to 1450° F. for two hours. This method is referred to in this specification as M steaming. As the regenerator temperature of the commercial cracking process became more severe, it was found that the temperature of steaming prior to testing should be increased to 1500° F. in order for the bench-scale test to give results which would be commercially meaningful.

To be representative of the still higher regeneration temperatures of modern catalytic cracking units, the steaming conditions are made even more severe. A temperature of 1550° for 2 hours prior to testing for catalyst was found to be more nearly representative of the effect of the regeneration operations in these more modern cracking operations. This steam pretreatment is referred to in this application as S+ steaming.

As is more fully shown below, zeolite catalysts of the faujasite type when subjected to S+ steaming are substantially inactivated.

While we do not wish to be bound by any theory of why this is so, we note that when these catalysts are subjected to heat and steam in regeneration during a commercial cracking operation, their X-ray diffraction pattern shows a substantial reduction of the peaks characteristic of faujasite.

Catalyst particles are used in various geometric forms depending on the nature of the apparatus in which the process is carried out. These include the so-called fixed-bed systems in which the cracking reaction and the regeneration are carried out in alternate stages without moving the catalyst. A more modern system is the moving-bed type in which the catalyst mass moves continuously in cycles of operation from the reaction zone to the regeneration zone and returns to the reaction zone. Catalysts used for these systems are of substantial size, such as cylindrical pellets of, for example, 3/16 to ¼ inch length and 3/16 inch in diameter.

A widely used process is the fluid catalytic cracking process. In this process, the catalyst is in the form of fine particles, for example, 20–80 micron diameter in microspheres. These are formed by spray drying water suspensions of the catalyst components. In the fluid catalytic cracking process, these microspheres are suspended in the hydrocarbon vapors in "dense" phase under cracking conditions. The hydrocarbon stream passes to a disengaging zone. Catalysts which are separated from the vapors are returned to the "dense" phase. The separated vapors are passed to the fractionation device. Spent catalyst passes to a steam-stripping section for removal of hydrocarbons. It is then transferred by carrier steam to the regeneration zone. The carbon and hydrocarbon contaminants in the spent catalyst are removed by combustion with hot air. The regenerated catalyst is returned to the reaction zone.

The combustion gases are exhausted through a cyclone or electrostatic collectors.

In this process, the catalyst particles encounter excessive abrasion as they collide with each other and with the walls of the apparatus. Excessive loss of catalyst in the effluent gases is encountered. Important, also, from an environmental standpoint is the discharge of particles to the air resulting from an inefficient operation of the catalyst separating devices.

The friability of the catalysts when used in the fluid catalytic operations is a disadvantage. It requires replenishment of the catalyst to make up for the loss due to attrition of the catalyst and also introduces an environmental hazard.

In order to rate catalysts according to their attrition resistance for use in fluid catalyst cracking process, a bench-scale test has been devised and has been used in this art. This test simulates the fluid-cracking process attrition conditions although operating under ordinary room temperature. It measures the rate of weight loss in a sample of microspheres under test which is lost in the effluent gases.

Figure 1:
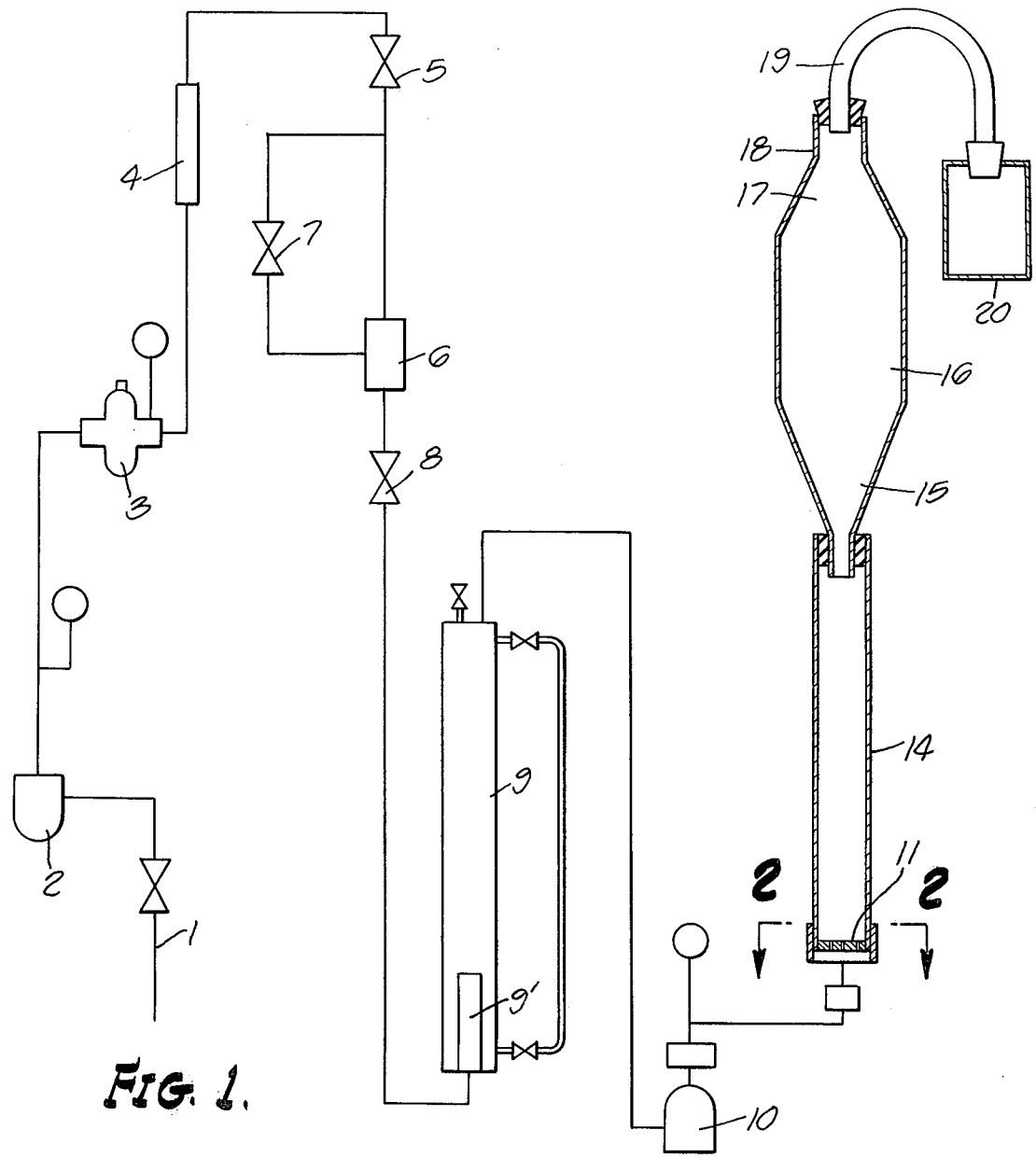
FIG. 1 is a schematic flow diagram of the test apparatus.
Figure 2:
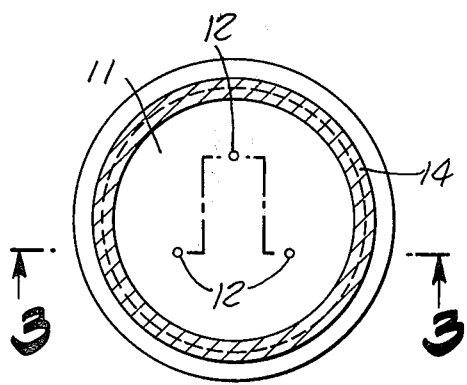
FIG. 2 is a section taken on line 2—2 of FIG. 1.
Figure 3:
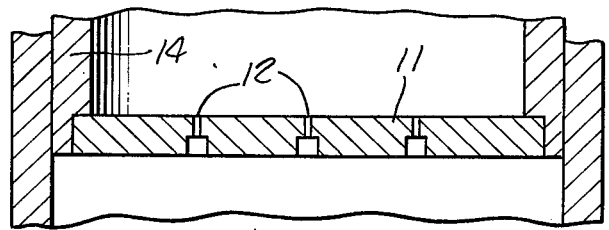
FIG. 3 is a section taken on line 3—3 of FIG. 2.

The apparatus is shown in FIGS. 1, 2, and 3.

An air supply 1 is connected to a filter 2 and to a pressure regulator 3, flow meter 4 and to the humidifier 9 through valve 5, regulator valve 7, flow controller 6 and valve 8. The air passes from the humidifer through a mist eliminator 10 and through symmetrically spaced bores in a 3/16 inch radius, ⅛ inch thick plate 11. The counter bores 12 on the entry side are 1/16 inch diameter and 1/16 inch deep. On the exit side, the holes are 0.0150 ± 0.0002 inch in diameter and 1/16 inch deep. The dense phase thin-walled stainless steel tube 14 is 1½ inches I.D. and 28⅝ inches in length. The disengaging space is formed of a conical section 15 of 9¾ inches length, a cylindrical section 16 5½ inches in diameter and 11 inches in length, an upper conical section 17, 4 inches in length, an exit spout 18 of 2 inches in length, an exit semicircular 1¼ inches glass tube 19 having a height measured from the top of 18 to the outer wall of the glass tubing of 4 inches. The glass tubing is connected to a porous bag 20.

The Condition of the Test

About 70 grams of the catalyst to be tested for attrition resistance is calcined at 1050° F. for 1 hour and after cooling screened through a 150-mesh screen and the sample not passing through the screen is discarded. The screened sample is agitated in a 16-ounce plastic container with 10% by weight of water and shaken by hand for at least 5 minutes to break up the lumps and to distribute the water evenly. The wetted sample is placed in a humidifier at 100% relative humidity for at least 1 hour. 50 grams of the humidified fraction is introduced into the tube 14. Air at 27 psig and at the rate of 22.5 cubic feet per hour, to give a jet velocity at the holes of 1700 feet per second, is passed into the tube 14. The catalyst is tumbled in the dense phase, and fines are separated in the disengagement space in 15 and 16 and collected in the bag 20. The material in 20 is collected and weighed after 1 hour, after 3 hours, and after 5 hours. The weight in grams of the fines after 5 hours multiplied by 2 is herein referred to as the attrition index, to wit, the percent loss of the catalyst due to attrition.

Many zeolite catalysts of the prior art, which show an excessive attrition loss in commercial fluid catalytic cracking, will have an attrition index of, according to this test, in excess of 30.

The catalysts of our invention have an attrition index of about 20 or less according to this test procedure.

STATEMENT OF THE INVENTION

We have discovered that the zeolite catalysts are improved in their thermal stability as measured after S+ steaming by the incorporation of a synthetic mica-montmorillionite alumino-silicate, which has been designated as SMM, with the zeolite when there is also present in the mixture an aluminium hydroxide in the form of pseudoboehmite. The catalyst maintains a high activity in cracking operation of moderate regeneration severity. It is much more active than prior art zeolite catalysts when subjected to high-severity regeneration conditions. We have also discovered that the addition of clay to replace part of the SMM in the above compounds may reduce the cost of the composite catalyst without seriously impairing its thermal stability.

We have also discovered that a further improvement in the thermal stability of the catalyst of our invention is attained by using a "peptized" pseudoboehmite.

We have found that catalyst formulated according to our invention for use in fluid-cracking units employing both moderate and more severe conditions in the regenerator may be formed using SMM of both high and low "dispersibility" as described herein. The attrition resistance of the zeolite-pseudoboehmite-SMM catalyst has a superior characteristic for use in a fluid-cracking process, when SMM used in the catalyst has a high "dispersibility" and when the pseudoboehmite is "peptized." Such catalyst will have, in addition to a superior attrition resistance, a hydrothermal stability of a degree which makes it suitable for fluid catalytic cracking units with high-severity regeneration conditions.

DETAILS OF THE INVENTION

The components which are used in formulating the catalyst of our invention are a zeolite, pseudoboehmite, and SMM. We may also include a clay.

The Zeolite Component

Such alumino-silicates may be the faujasite zeolites previously referred to. We prefer to use and have used in the following examples an alumino-silicate produced by silication of clays as described in U.S. Pat. No. 3,446,727. We prefer for use in the catalyst of high thermal stability of our invention such zeolites having $SiO_2/Al_2O_3$ molar ratios in excess of 3 and preferably above 4.

An example of the zeolitic alumino-silicate and its method of formation is described in Example 2 of the U.S. Pat. No. 3,446,727. The $SiO_2/Al_2O_3$ molar ratio of the resultant alumino-silicate as produced by the process of the patent, by adjustment of the reaction conditions, may be increased to a ratio above 4. The $Na_2O$ content may be adjusted by exchange of the zeolite with the $MgSo_4$ and rare-earth sulfate solution to the degree desired. The usual content of sodium in the zeolites employed in these catalysts is less than 5% by weight expressed as $Na_2O$. By carrying the exchange further, the percent $Na_2O$ may be reduced to 2 or less.

Catalysts have also been formed by exchanging with acid or ammonium salts to reduce the $Na_2O$ content of the zeolite. The conditions for exchanging zeolitic alumino-silicates are well known in the prior art.

In formulating our catalyst, we have used as typical of the zeolite catalyst a silicated clay produced according to Example 2 of the aforesaid U.S. Pat. No. 3,446,727. Instead of an acid-treated clay, we may use a kaolin which has been calcined sufficiently to destroy its crystallinity as evidenced by its X-ray pattern.

In order to obtain a silicated clay having an $SiO_2Al_2O_3$ ratio in excess of 4, we adjust the components to increase the $SiO_2$ to $Al_2O_3$ ratio in the reaction. The following is an example of the reaction composition produced from a mixture of sodium silicate, sodium hydroxide, and sodium chloride of composition expressed in mol percent as $SiO_2$, 5.27 mol %; $Na_2O$, 3.5 mol %; Cl, 1.7 mol %; the rest, water. The solution is mixed with calcined kaolin. The reaction mixture includes 12.5 parts by weight of the above solution mixed with 1 part by weight of the kaolin. The reaction temperature is held at about 60° F. to 75° F. for a period of about 4 days. The clay mixture after this low temperature digestion step is heated with live steam to about 190° F. until crystallization is complete, for example, 72 hours. The crystalline material is filtered and washed. The silicated clay had a $SiO_2/Al_2O_3$ net ratio of about 4.3 and 13.5% by weight of $Na_2O$ on a volatile free (V.F.) basis. The ratios and compositions given above are merely exemplary. Variation of the components and of the times and temperatures, as is usual in commercial operations, will produce silicated clay having $SiO_2/Al_2O_3$ mole ratios varying from about 4 to about 5. Zeolites with $SiO_2/Al_2O_3$ mole ratios above 5 may be obtained by increase of the $SiO_2$ in the reaction mixture.

The sodium form of the alumino-silicate as produced by synthesis according to the aforesaid prior art is exchanged with polyvalent cations as is described in the prior art. In formulating the catalyst of our invention, we also desire to exchange the sodium form with polyvalent cations such as have been used in the prior art, preferring to use as exchange cations Mg and rare earth as described in the U.S. Pat. No. 3,446,727 to reduce the $Na_2O$ content to about 5% by weight or less. The following are examples of the zeolites which may be produced according to the above procedure:

| SAMPLE A | SAMPLE B |
|---|---|
| $SiO_2/Al_2O_3$ ratio 4.2 | $SiO_2/Al_2O_3$ ratio 4.2 |
| $Na_2O$ - 4.5% by weight | $Na_2O$ - 2.0% by weight |
| MgO - 3.2% by weight | MgO - 1.4% by weight |
| REO - 12.0% by weight | REO - 19.0% by weight |

REO is determined as rare earth oxide.

The X-ray pattern of the zeolite shows lines also found in the faujasite X-ray pattern.

SMM Component

The synthetic alumino-silicate, herein referred to as SMM has been identified as of mixed layer crystal structure with randomly alternating layers of montmorillonite-like and mica-like clay mineral. (See Granquist U.S. Pat. No. 3,252,757, of May 24, 1966; Cappell et al U.S. Pat. No. 3,252,889 of May 24, 1966; Granquist et al "Sorption of Water at High Temperatures on Certain Clay Mineral Surfaces, Correlation with Lattice Fluoride," Clay and Clay Minerals, Proceedings of the 15th Conference New York, 1967; Wright et al "Catalysis by Layer Lattice Silicates. I. The Structure and Thermal Modification of a Synthetic Ammonium Dioctahedral Clay" Journal of Catalysis, Vol. 25, No. 1, 1972, pp. 65–80.)

For purposes of identification of the said alumino-silicate in this application, it is herein designated as SMM, meaning the above product as described in the above patents and in this specification.

The SMM we have employed in producing the catalyst of this invention was a product of Baroid Division NL Industries, Inc. of Houston, Tx. It may be produced as described in the aforesaid U.S. Pat. No. 3,252,889. SMM may have a dispersibility index ranging from about 10 to 100%. Of the samples of SMM discussed below, Sample C had a dispersibility index of 96%, Sample D had a dispersibility index of 60%, and Sample E had a dispersibility index of 80%.

We have found, as will be described below, for purposes of our invention we may include the SMM materials having $SiO_2:Al_2O_3$ ratios less than 2.4.

| A typical analysis of calcined Sample C is $SiO_2:Al_2O_3$ ratio = 2.2 | |
|---|---|
| $Na_2O$ | 0.39% by weight |
| $NH_3$ | 2.67% by weight |
| $Fe_2O_3$ | 0.06% by weight |
| F | Trace |
| A typical analysis of Grade Sample E is $SiO_2:Al_2O_3$ ratio 2.39 | |
| $SiO_2$ | 55.6% by weight |
| $Al_2O_3$ | 39.6% by weight |
| $Na_2O$ | 0.18% by weight |
| MgO | 0.05% by weight |
| $TiO_2$ | 1.23% by weight |
| $Fe_2O_3$ | 0.29% by weight |
| $NH_3$ | 2.9% by weight |

For purposes of producing a microsphere catalyst having a suitable resistance to abrasion, we prefer to employ an SMM material which shows a strong 001 X-ray diffraction peak of an oriented sample from a water suspension (see U.S. Pat. No. 3,252,757, Col. 5, line 65 et seq). When dispersed in water in the following test, the SMM desirably should have a dispersibility index of about 70 or more and more desirably 80 or more to be the type which is desirable to be used in our catalyst.

A 1-gram sample is ignited at 1050° F. for 30 minutes and reheated at 1850° F. for 30 minutes and reweighed. The fraction of the weight loss is determined.

An amount of SMM equivalent to 1 gram on the 1850° F. ignited basis, determined as above, is weighed and added to 500 ml of deionized water in a kitchen-size blender (Osterizer) and mixed at high speed (frappe) for 5 minutes. The suspension is poured into a 600 ml beaker, 8.5 cm I.D., being sure that all of the material is transferred. The suspension is allowed to stand for 10 minutes without agitation. A sample is removed by a pipette from the top ½ inch layer and may be used for oriented X-ray study (see U.S. Pat. No. 3,252,757, Col. 5 and FIG. 2). After 1-hour standing, it is decanted without disturbing the settled material. The sediment is filtered by wash-bottle technique through a filter paper. The filter paper and its contents are ignited in an oven at 1050° F. for 30 minutes and then at 1850° F. The ignited sample is weighed. The difference from 1 gram expressed in percent is herein referred to as the "dispersibility index." We have found that an SMM which will not qualify in the above dispersibility test, i.e., as having a dispersibility index of about 70 or more, will not have the aforesaid 001 peak in the oriented X-ray pattern of the intensity of those that do so qualify.

The Pseudoboehmite Component

The hydrated alumina which we prefer to use includes a substantial proportion above 25% and preferably substantially entirely a gelatinous aluminium monohydrate AlOOH. The X-ray pattern of the pseudoboehmite shows a broad peak in the range of 10° to 18° peaking at 13.5° in a pattern produced from copper K alpha radiation. (For further details of the composition and crystal structure, see Karl Wafers and Gordon M. Bell Technical Paper No. 19, Alcoa Research Laboratories, 1972, pp. 11 et seq.) The process of Example 1 of U.S. Pat. No. 2,935,463 is reported in said patent to produce a product containing a hydrated alumina gel, identified as boehmite and crystalline aluminum trihydroxides. The gel type of boehmite is here identified as pseudoboehmite. We may produce a purer form of pseudoboehmite substantially free of crystalline trihydroxides by suitably modifying the procedure described in the above patent. Other types of pseudoboehmites are commercially available, such as hereinafter dscribed. These forms are substantially free of crystalline aluminum trihydroxides.

Pseudoboehmites may be formed by other procedures (see Technical Paper No. 19). We prefer to employ a pseudoboehmite which is substantially free of Na cations. Preferably, we wish to employ those with but a trace of Na, by atomic absorption test, expressed as $Na_2O$, for example, less than 0.01%. In determining the Na content of the pseudoboehmite, the Na cation in the water in which the alumina is suspended is to be excluded. Examples of such pseudoboehmites are described below.

We prefer to employ this pseudoboehmite after acid treatment. The acid which we prefer to use in the peptization reaction is $HNO_3$. The quantity used is about 0.08 to about 0.16 grams $HNO_3$ per gram $Al_2O_3$ on a volatile-free basis. We refer to this treatment as peptization and the resultant pseudoboehmite as peptized.

The hydrated alumina which we prefer to use has a high "peptizability index," preferably above 0.5%. We have employed the following procedure in selecting the pseudoboehmite which is peptizable for purposes of the catalyst of our invention.

50 ml of a slurry of alumina containing 6.3 grams $Al_2O_3$ is added to 100 ml of deionized water and 1 ml of concentrated $HNO_3$ (1 gm $HNO_3$). This mixture is stirred and then centrifuged for 5 minutes (1800 rpm average radius 6 inches). The supernatant liquid is decanted, evaporated to dryness, ignited at 1850° F. and weighed. The ignited weight expressed as percent of the original weight of the solids (ignited weight basis) is the peptizability index of the alumina. The pseudoboehmites are distinguished from the crystalline trihydroxides in that the latter in this test are substantially completely precipitated in the centrifuge.

The pseudoboehmite may contain crystalline trihydrate components such as bayerite, nordstrandite, and gibbsite. We prefer that the alumina contain at least 25% and more preferably 50% or more by weight of pseudoboehmite.

The alumina hydrate may be formed as described in U.S. Pat. No. 2,935,463. See example 1. The preferred pseudoboehmite is formed as described in the said patent with the following modifications. The ammonium alum crystals are formed from aluminum sulfate obtained by dissolving gibbsite [$Al(OH)_3$] metallurgical grade in sulfuric acid. The ammonium alum crystals are exchanged with 28% $NH_3$ in water for 30 minutes at about 100° F. The thickening and washing operation as described in the above patent is carried out at about 140°–180° by injection of steam. The alumina is washed to about 2–4% $SO_3$ based on the alumina volatile free. The resultant product according to an X-ray spectrogram, is substantially all pseudoboehmite and contains a small fraction, perhaps about 5%, of a crystalline trihydroxide, to wit, bayerite. We refer to this alumina as Sample F. The spray-dried slurry is referred to as F-1.

The pseudoboehmite may occur mixed with crystalline aluminum trihydroxides, for example, the hydrated alumina produced as described in the aforesaid U.S. Pat. No. 2,935,463 which is identified in said patent as containing about 35% of the gelatinous monohydrate, boehmite, here identified as pseudoboehmite and also containing bayerite.

Another suitable composition of the alumina to be used in our invention is produced by prolonged aging of the pseudoboehmite produced by the modification of the process described in U.S. Pat. No. 2,935,463 detailed above. To an aqueous dispersion of alumina containing about 8.5 lbs. of alumina hydrate (expressed as $Al_2O_3$) in 50 lbs. of water a gallon of concentrated ammonia was added. The mixture was aged for a period of a month at room temperature. The resultant alumina contained about 45% of pseudoboehmite, 33% bayerite, 17% nordstrandite, and 5% gibbsite. We refer to this product as Sample G. (See the aforesaid Technical Paper for the identification of the nature of the above crystalline trihydroxides). The percentages were determined from X-ray spectrograms. (See Harold Klug and LeRoy E. Alexander "X-ray Diffraction Procedures" John Wiley & Sons, 1954, Section 7, Pages 390–438). While we do not wish to be bound by any theory of the action of the crystalline trihydroxides, they appear to be merely inert diluents.

For purposes of improving the thermal stability of the catalyst, the crystalline aluminum trihydroxides appear to act as a diluent. The improvement of the stability by the pseudoboehmite is not impaired by the crystalline aluminum trihydroxides, provided that the mixture is used in sufficient amount in the catalyst to provide the suitable concentration of pseudoboehmite. However, for purposes of improving the attrition resistance, the preferred material is one substantially free of crystalline aluminum oxides.

The pseudoboehmite is improved for use in the composition by acidification (peptization), preferably with nitric acid as described above. We identify the peptized form of the alumina by the symbol P. We have found that in order to obtain an alumina which has the function of improving the high temperature stability and attrition resistance of the catalyst it should have a measurably substantial amount of material which is dispersible in water, either as a soluble compound or as a colloid. In order to rate the aluminas for our purpose, we find preferably that an alumina should have a high peptizability index and be substantially free of sodium. The details of the peptizability test procedure are described below. We find that the crystalline trihydroxides show less than 0.5% peptizable component.

We have found that the pseudoboehmites show an index which is of a different order of magnitude than the peptizability index of the crystalline aluminum trihydroxides as will be described below.

The Clay Component

The catalysts of the prior art have included various additives which are referred to as matrix. They include crystalline materials, such as crystalline aluminum trihydroxides and clays or amorphous products, such as calcined kaolin or silica gels or composite gels, such as silica-alumina gels. While we do not wish to be bound by any theory of the usefulness of these so-called matrix materials, we believe that they improve the porosity of the catalysts. The increase in porosity aids in regeneration of the catalyst which becomes contaminated with carbon and high-boiling hydrocarbons as a result of the cracking reaction. There are, however, diluents which may not improve the catalytic activity.

In the catalysts of our invention, the matrix which may be catalytically inactive or of low activity, when added in substantial proportions in place of SMM, has little effect on the M steam activity of the catalysts. It results in a minor depreciation in the S+ steam activity. By adjusting the proportions of the ingredients of the zeolitic alumino-silicate-SMM-pseudoboehmite-clay complex the attrition resistance of the above complex can be maintained at a satisfactory level.

The preferred matrix for use in our catalyst is a kaolin clay. For purposes of improving the catalytic activity of the complex, we find that kaolin, either activated by acid treatment, such as acid-treated halloysite clay as described in Example 3 of U.S. Pat. No. 2,935,463 or calcined kaolin. Acid-activated sub-bentonite described in Example 4 of said patent, may be used. The acid-treated halloysite is referred to as Sample H and acid-treated bentonite as Sample J. Ball clay (Sample I) may also be used in place of the halloysite. When added to the complex, they cause some increase in the M steam activity and, depending on the degree of replacement of SMM by the clay, a depreciation in S+ activity.

We prefer for purposes of obtaining a catalyst of both high thermal stability and superior attrition resistance to employ a kaolin and preferably either acid-treated halloysite or ball clay.

The Catalyst

The catalyst of our invention comprises a mixture of SMM, an alumina having a substantial content of pseudoboehmite and a faujasite zeolite.

The range of compositions of the catalyst of my invention as set forth above includes the zeolite of the faujasite type in the range of about 10 parts by weight to about 25 parts by weight, peptized pseudoboehmite substantially free of sodium from about 10 parts by weight to about 25 parts by weight and SMM from about 20 parts by weight to about 65 parts by weight; the sum of the parts of the three components equals substantially 100 parts by weight.

The catalyst may include a matrix. When the matrix is used, it is added in an amount of about 10 to about 50 parts by weight. In such case, the sum of the parts of the aforesaid components including clay equals substantially 100 parts by weight.

The preferred pseudoboehmite is one substantially free of crystalline aluminum trihydroxides and contains less than 0.01% Na expressed as $Na_2O$ and has a peptizability index of more than 5%. Such material may include other crystalline aluminum trihydroxides such as gibbsite, nordstrandite and bayerite which for our purposes may be viewed as inert diluents. The proportion of the aluminum hydroxides which is pseudoboehmite may be determined by the X-ray techniques referred to above. We prefer to use the pseudoboehmite in its peptized state.

The preferred catalyst contains polyvalent cation exchanged zeolite of the faujasite type in the range of from about 15 parts by weight to about 20 parts by weight, said zeolite analyzing less than about 5% $Na_2O$ and said pseudoboehmite in the range of 20 parts by weight to about 45 parts by weight and SMM in the range of about 40 parts by weight to about 65 parts by weight, the sum of the parts of the aforesaid components equaling substantially 100 parts by weight.

For purposes of obtaining a catalyst of superior attrition resistance, we prefer to use an SMM having a dispersibility index of more than 60%.

Such catalysts will have a substantially improved thermal stability and thus a higher catalytic cracking activity as compared with the prior art catalyst containing the zeolitic alumino-silicates.

We prefer to incorporate kaolin clays into the aforesaid catalyst complex and prefer to use acid-treated halloysite or ball clay or mixtures thereof. When incorporating clay, we adjust the weight ratio of the components expressed as percent by weight so that SMM be in the range of about 20 parts by weight to about 40 parts by weight, clay in the range of about 15 parts by weight to about 50 parts by weight, the aforesaid pseudoboehmite in the range of about 10 parts by weight to about 25 parts by weight, and zeolite in the range of from about 10 parts by weight to about 25 parts by weight on a volatile free basis, the sum of said parts equaling substantially 100 parts.

All weights and parts are on a volatile free basis.

Kaolin clays are suitable for use in the above catalyst for purposes of obtaining a catalyst of high thermal stability.

For purposes of obtaining a catalyst of suitable thermal stability and high attrition resistance, we may use in the above catalyst, SMM, pseudoboehmite and zeolitic alumino-silicate, a clay diluent, with acid-treated halloysite clay and the ball clays or mixtures thereof as the preferred clays for this purpose.

The preferred catalyst, when used in processes where the attrition resistance is not significant, is one having an S+ steam activity by the aforesaid microactivity test of in excess of 30 and preferably in excess of 40. When employed in the fluid catalytic cracking process, the catalyst has an attrition index of 20 or less.

In order to obtain catalysts with superior attrition resistance, we prefer to select an SMM to be used in our catalyst which has a superior dispersibility index of about 70 or more will when used in the aforesaid composition give catalysts having attrition indexes of about 20 or less.

The following Examples illustrate the principles of our invention. They are presented for purposes of explanation and not as a limitation of our invention. The proportions of the components of the catalyst in all of the examples are on a volatile free (VF) basis.

EXAMPLE 1

The following data illustrate the effect of the addition of pseudoboehmite on the thermal stability of zeolite-alumino-silicate catalyst containing SMM. Nineteen percent zeolitic-alumino-silicate (Sample B) was mixed in water with 30% SMM (Sample E) and 51% by weight acid-treated halloysite (Sample H). The mixture was mixed and spray dried. It is referred to as Sample 1. One portion was subjected to M steaming and to the microactivity test. Another portion was subjected to S+ steaming and to the microactivity test. Another portion was tested by the attrition test. The observed result was as follows:

5 hours attrition index — 48
M steam activity — 74% conversion
S+ steam activity — 31% conversion The catalyst was formulated as above but the clay was reduced to 33 and 18% of peptized pseudoboehmite Sample F (P) was added and the catalyst processed as above. This sample is referred to as Sample 2. The product was subjected to testing as described above. The results obtained were:

5 hour attrition index — 14
M steam activity — 76% conversion
S+ steam activity — 52% conversion Another sample, Sample 3, was formulated with the ingredients in the same proportions as in Sample 1; but the SMM Sample E was replaced in the same ratio by SMM Sample C and subjected to the same test. The results were:

5 hour attrition index — 47
M steam activity — 71% conversion
S+ steam activity — 21% conversion A composite Sample 4 was formulated similar to Sample 3 but reducing the clay to 33% and adding 18% of the alumina as Sample F (P).

5 hour attrition index — 16
M steam activity — 73% conversion
S+ steam activity — 41% conversion The addition of the alumina caused a substantial improvement in both the thermal stability and the attrition resistance of the catalyst.

EXAMPLE 2

The unique properties of the pseudoboehmite in improving the attrition resistance of the catalyst and its thermal stability are illustrated by the following example. A series of catalysts was formulated as described for Sample 2 of Example 1 but in which various aluminas were employed. Each of the aluminas except as indicated was used, both the peptized and unpeptized state.

Two of the aluminas used were Sample F and Sample G. Sample F was used as a slurry in mixing with the other components of the catalyst. We refer to the slurry as F. It was also used after spray drying. The spray-dried material was then mixed with the other ingredients to give the slurry F-1. The following other aluminas were used:

1. A product sold by Continental Oil Co. under the name Catapal SB — Sample 5. It is stated to be produced by hydrolysis of aluminum alkoxides, produced by reaction of aluminm triethyl and ethylene followed by oxidation of the aluminum alkyls.
2. Kaiser Aluminas SA Medium (sold by Kaiser Chemicals) — Sample 6.
3. The following products sold by Aluminum Co. of America under their trade name Alcoa:
   Alcoa C 37 — Sample 7
   Alcoa C 30 — Sample 8
   Alcoa 705 — Sample 9
   Alcoa Paper Grade — Sample 10
   Alcoa "Bayer Scale Fines" — Sample 11

The crystal form of aluminas Sample F and Sample G have been developed above. Samples 5 and 6 were substantially completely pseudoboehmite. Sample C 37 contained ⅔ bayerite and ⅓ nordstrandite. All of the other Alcoa aluminas were entirely gibbsite.

Each of the aluminas was tested for its peptizability and formulated into a catalyst as in Example 1 and tested for its activity and attrition index by the tests referred to above. The results are tabulated in Table I.

TABLE I

| Sample | Peptizability Index % | % $Na_2O$ | Peptized Yes | Peptized No | 5-Hour Attrition Index | M Steam Activity | S+ Steam |
|---|---|---|---|---|---|---|---|
| F | 14 | 0.003 | | x | 39 | 73 | 30 |
| F (P) | | | x | | 14 | 76 | 52 |
| F-1 (P) | | 0.003 | x | | 11 | 76 | 53 |
| G | | 0.003 | | x | 54 | | |
| G (P) | | | x | | 57 | 77 | 49 |
| 6 | 6.6 | 0.02 | | x | 41 | 72 | 37 |
| 6P | | | x | | 56 | 75 | 38 |
| 5 | 72 | 0.003 | | x | 44 | 75 | 32 |
| 5P | | | x | | 15 | 76 | 53 |
| 7 | 0.3 | | | | 49 | 75 | 26 |
| 7P | | | x | | 69 | 74 | 23 |
| 8 | 0.1 | | | x | 35 | 70 | 27 |
| 8P | | | x | | 48 | 73 | 20 |
| 9 | 0.1 | | | x | 51 | 76 | 33 |
| 9P | | | x | | 51 | 79 | 25 |
| 10 | 0.2 | | | x | Disintegrated | 79 | 32 |
| 10P | | | x | | " | 80 | 34 |
| 11 | 0.1 | | | x | 39 | 72 | 25 |
| 11P | | | x | | 63 | 78 | 36 |
| Example 1 Sample 1 | | | | | 48 | 74 | 31 |

The data show that the pseudoboehmites when peptized are very effective in improving the thermal stability of the catalyst. Compare the pseudoboehmite Samples F(P), F-1(P), G(P), 5P, 6P with Sample 1 of Example 1. The M activity of Sample 1 of Example 1 containing no pseudoboehmite is equaled by the above samples but the S+ activity was substantially increased. Of the pseudoboehmites, the Sample 6 or 6P, having a low peptizability index and relatively high Na₂O content had the least effect but did improve the S+ activity substantially. On the other hand, the crystalline trihydrates, Samples 7-9, in both the peptized and unpeptized form, had little effect on the S+ steam activity. The peptized 10P and 11P form of Samples 10 and 11 show some improvement in S+ activity similar to the unpeptized form of Sample F; but in their unpeptized form, they do not improve the thermal stability of the catalyst.

The effect of the peptizing pseudoboehmite of low sodium content on the attrition resistance is evident. This effect is evident from the attrition data of Samples F and 6. Sample 5 of relatively low peptizability index and relatively high sodium content, like all of the aluminum trihydroxides Samples 7-11, is not improved in attrition index by peptization, in some cases, as is evident from the table peptization results in an increase in the friability of the catalyst microspheres.

EXAMPLE 3

The following example illustrates the effect of the type of SMM on the heat stability and attrition index. Catalysts were formulated using Sample F pseudoboehmite alumina and using SMM and in another using peptized F, i.e., Sample F(P). These materials were separately formulated with SMM Sample C, SMM Sample D, and SMM Sample E. The formation was as described in Example 1 using the 19% zeolitic alumino-silicate Sample B, 18% pseudoboehmite, 30% SMM and 33% acid-treated halloysite Sample H.

The results obtained from the various catalysts as affected by the presence of pseudoboehmite in its form as peptized and not peptized and the dispersibility of the SMM are shown in Table II.

The presence of the pseudoboehmite in its peptized form is advantageous in producing a catalyst of improved thermal stability irrespective of the dispersible nature of the SMM. Compare Samples 12, 14-16 with Sample 1 of Example 1. However, the dispersibility of the SMM when used with the peptized pseudoboehmite has a material influence on the attrition index. Compare Sample 14 with Samples 12 and 16.

EXAMPLE 4

The effect of clay in the zeolite-SMM-pseudoboehmite complex is shown by Example 4. A series of catalysts was formulated in the manner described in connection with Example 1. The zeolite alumino-silicate employed was Sample A, the SMM was Sample C, the pseudoboehmite was F(P). The composition of the catalysts and the 5-hour attrition index and the M steam and S+ steam stability are given in Table III.

TABLE III

| Sample | Zeolite Sample % | | SMM Sample C % | Pseudoboehmite Sample F (P) % | Clay Type | % | 5-Hour Attrition Index | M Steam Activity | S+ Steam Stability |
|---|---|---|---|---|---|---|---|---|---|
| 17 | A | 14 | 0 | 18 | I | 68 | 14 | 69 | 24 |
| 18 | A | 14 | 18 | 18 | I | 50 | 7 | 75 | 29 |
| 19 | A | 14 | 32 | 18 | I | 36 | 8 | 78 | 37 |
| 20 | A | 14 | 49 | 18 | I | 19 | 5 | 74 | 44 |
| 21 | A | 14 | 68 | 18 | I | 0 | 7 | 74 | 57 |
| 22 | A | 14 | 0 | 18 | H | 68 | 12 | 74 | 12 |
| 23 | A | 14 | 18 | 18 | H | 50 | 9 | 75 | 33 |
| 24 | A | 14 | 32 | 18 | H | 36 | 7 | 75 | 42 |
| 25 | A | 14 | 49 | 18 | H | 19 | 6 | 76 | 54.6 |
| 26 | A | 14 | 68 | 18 | H | 0 | 7 | 74 | 57 |
| 27 | B | 19 | 30 | 18 | Kaolin | 33 | 30 | 74 | 50 |
| 28 | B | 19 | 30 | 18 | J | 33 | 57 | 75 | 50 |

As the percentage of clay increases at the expense of the SMM content, the thermal stability of the catalyst depreciates. From the point of view of the activity, the highest activity is attained when the clay is omitted. This, however, in addition to other disadvantages referred to above raises the price of the catalyst due to the high cost of the SMM. As appears from the above, an SMM:clay ratio 2.5 or more parts by weight of SMM to 1 part by weight of clay produces a catalyst of superior and very useful thermal stability. See Samples 20, 21 and 25 through 28.

From the point of view of attrition resistance, even a major substitution of clay for SMM, particularly when the clay is acid-treated halloyside Sample H or ball clay Sample I results in a catalyst of excellent attrition resistance, a ratio of SMM to clay of from about 2.5 parts by weight of SMM to 1 part by weight of clay and as low as about 1 part by weight of SMM to about 2.5 parts by weight of clay produces a catalyst of superior attrition resistance. The advantage of reducing the concentration of clay component by substitution with SMM in

TABLE II

| Sample | SMM Sample | Dispersibility Index | AlOOH Peptized | AlOOH Not Peptized | 5-Hour Attrition Index | M Steam Activity | S+ Steam Activity |
|---|---|---|---|---|---|---|---|
| 12 | C | 96 | x | | 16 | 73 | 41 |
| 13 | C | 96 | None | None | 47 | 71 | 21 |
| 14 | D | 60 | x | | 54 | 70 | 52 |
| 15 | D | 60 | | x | 52 | 73 | 49 |
| 16 | E | 80 | x | | 11 | 78 | 50 |
| Sample 1 Example 1 | E | 80 | None | None | 48 | 74 | 31 | producing a catalyst of higher heat stability is evident by comparing the S+ activity of Sample 17 with the other samples.

We claim:

1. A cracking catalyst comprising a cation exchanged zeolite of the faujasite type in the range of about 10 parts by weight to about 25 parts by weight, peptized pseudoboehmite substantially free of sodium in the range of from about 10 parts by weight to about 25 parts by weight, and SMM in the range from about 20 parts by weight to about 65 parts by weight; and clay in the range of about 10 to about 50 parts by weight, the sum of the parts all equaling 100 parts by weight.

2. The catalyst of claim 1 in which the pseudoboehmite contains less than about 0.01% Na expressed as $Na_2O$ and has a peptization index of more than about 5%.

3. The catalyst of claim 1 in which the SMM has a dispersibility index of more than about 60%.

4. The catalyst of claim 2 in which the SMM has a dispersibility index of more than about 60%.

5. A cracking catalyst comprising a cation exchanged zeolite of the faujasite type in the range of from about 15 parts by weight to about 20 parts by weight, said zeolite analyzing less than about 5% $Na_2O$, a pseudoboehmite substantially free of sodium of peptizability index of more than about 0.5%, in the range of 20 parts by weight to about 45 parts by weight and SMM in the range of about 40 parts by weight to about 65 parts by weight, the sum of the parts of the aforesaid components equaling substantially 100 parts by weight.

6. The catalyst of claim 5 in which the pseudoboehmite contains less than about 0.01% Na expressed as $Na_2O$ and has a peptizability index of more than about 5%.

7. The catalyst of claim 5 in which the SMM has a dispersibility index of more than about 60%.

8. The catalyst of claim 6 in which the SMM has a dispersibility index of more than about 60%.

9. The catalyst of claim 2 which has an S+ steam activity of more than about 40.

10. The catalyst of claim 3 which has an attrition index of less than about 30.

11. The catalyst of claim 4 which has an S+ steam activity of more than about 40 and an attrition index of less than about 30.

12. The catalyst of claim 6 which has an S+ steam activity of more than about 40.

13. The catalyst of claim 7 which has an attrition index of less than about 20.

14. The catalyst of claim 8 which has an S+ steam activity of more than about 40 and an attrition index of less than about 20.

15. The catalyst of claim 1 in which the SMM is in the range of about 20 parts by weight to about 40 parts by weight and also comprising clay in the range of 15 parts by weight to about 50 parts by weight, the parts by weight of the aforesaid components adding to substantially 100 parts by weight.

16. The catalyst of claim 15 in which the pseudoboehmite contains less than about 0.01% Na expressed as $Na_2O$ and has a peptizability index of more than about 0.59.

17. The catalyst of claim 15 in which the SMM has a dispersibility index of more than about 60%.

18. The catalyst of claim 16 in which the SMM has a dispersibility index of more than about 60%.

19. The catalyst of claim 16 which has an S+ steam activity of more than about 40.

20. The catalyst of claim 17 which has an attrition index of less than about 30.

21. The catalyst of claim 15 which has an S+ steam activity of more than about 40 and an attrition index of less than about 30.

22. The catalyst of claim 15 which has an attrition index of less than about 20.

23. The catalyst of claim 15 which has an S+ steam activity of more than 40 and an attrition index of less than about 20.

24. A cracking catalyst comprising a cation exchanged zeolite of the faujasite type, SMM and pseudoboehmite substantially free of sodium, and clay said catalyst having an S+ steam activity of more than about 40.

25. The catalyst of claim 24 in which the pseudoboehmite has a peptizability index of more than about 0.5%, said SMM having an attrition index of more than about 60%.

26. A cracking catalyst comprising a cation exchanged zeolite of the faujasite type, SMM, and pseudoboehmite substantially free of sodium, said catalyst having an attrition index less than about 30.

27. The catalyst of claim 26 in which the pseudoboehmite contains less than 0.01% Na expressed as $Na_2O$ and has a peptizability index of more than about 0.5%.

28. The catalyst of claim 26 and also comprising a matrix.

29. The catalyst of claim 28 in which the psudoboehmite contains less than about 0.01% Na expressed as $Na_2O$ and has a peptizability index of more than about 5%.

30. A catalyst according to claim 26 in which the SMM has a dispersibility index of more than about 60%.

31. A catalyst according to claim 28 in which the pseudoboehmite contains less than 0.01% Na expressed as $Na_2O$ and has a peptizability index of more than about 5% and the SMM has a dispersibility index of more than about 60%.

32. A cracking catalyst comprising a cation exchanged zeolite of the faujasite type, SMM, and pseudoboehmite substantially free of sodium, said catalyst having an S+ steaming stability of more than about 40.

33. The catalyst of claim 32 in which the pseudoboehmite contains less than 0.01% Na expressed as $Na_2O$ and has a peptization index of more than about 5%.

34. The catalyst of claim 32 and also comprising a matrix.

35. The catalyst of claim 34 in which the pseudoboehmite has a peptizability index of more than about 0.5% and the catalyst has an S+ steaming stability of more than about 40.

36. The catalyst of claim 35 in which the pseudoboehmite contains less than 0.01% Na expressed as $Na_2O$.

37. The catalyst of claim 36 in which the SMM has a dispersibility index of more about 40 and the catalyst has an attrition index of less than about 30.

* * * * *